(12) United States Patent
Michel et al.

(10) Patent No.: US 7,611,812 B2
(45) Date of Patent: Nov. 3, 2009

(54) USE OF SALTS OF LAYERED DOUBLE HYDROXIDES AS CHARGE CONTROL AGENTS

(75) Inventors: Eduard Michel, Frankfurt am Main (DE); Ruediger Baur, Eppstein-Niederjosbach (DE); Hans-Tobias Macholdt, Darmstadt-Eberstadt (DE)

(73) Assignee: Clariant Produkte ( Deutschland) GmbH, Sulzbach (DE)

( * ) Notice: Subject to any disclaimer, the term of this patent is extended or adjusted under 35 U.S.C. 154(b) by 404 days.

(21) Appl. No.: 10/523,536

(22) PCT Filed: Jul. 9, 2003

(86) PCT No.: PCT/EP03/07423

§ 371 (c)(1),
(2), (4) Date: Feb. 2, 2005

(87) PCT Pub. No.: WO2004/019137

PCT Pub. Date: Apr. 3, 2004

(65) Prior Publication Data

US 2005/0277040 A1 Dec. 15, 2005

(30) Foreign Application Priority Data

Aug. 3, 2002 (DE) ................................ 102 35 571

(51) Int. Cl.
G03G 9/08 (2006.01)
(52) U.S. Cl. .............. 430/108.2; 430/108.1; 430/108.4; 430/137.1
(58) Field of Classification Search .............. 430/108.2, 430/108.1, 108.4, 137.1
See application file for complete search history.

(56) References Cited

U.S. PATENT DOCUMENTS

| | | | |
|---|---|---|---|
| 4,912,006 A | 3/1990 | Breitschaft et al. | |
| 5,021,473 A | 6/1991 | Macholdt et al. | |
| 5,051,676 A | 9/1991 | Sekiet et al. | |
| 5,069,994 A | 12/1991 | Gitzel et al. | |
| 5,147,748 A | 9/1992 | Gitzel et al. | |
| 5,244,764 A | 9/1993 | Uno et al. | |
| 5,288,581 A | 2/1994 | Ziolo | |
| 5,292,910 A | 3/1994 | Raths et al. | |
| 5,326,891 A | 7/1994 | Bruer et al. | |
| 5,342,723 A | 8/1994 | Macholdt et al. | |
| 5,360,859 A * | 11/1994 | Ogawa et al. | ............... 524/437 |
| 5,378,571 A | 1/1995 | Macholdt et al. | |
| 5,401,809 A | 3/1995 | Gitzel et al. | |
| 5,475,119 A | 12/1995 | Baur et al. | |
| 5,502,118 A | 3/1996 | Macholdt et al. | |
| 5,554,739 A | 9/1996 | Belmont | |
| 5,563,016 A | 10/1996 | Baur et al. | |
| 5,585,216 A | 12/1996 | Baur et al. | |
| 5,728,364 A | 3/1998 | Horn et al. | |
| 5,728,366 A | 3/1998 | Horn et al. | |
| 6,030,738 A | 2/2000 | Michel et al. | |
| 6,083,653 A | 7/2000 | Baur et al. | |
| 6,207,335 B1 * | 3/2001 | Michel et al. | ............... 430/114 |
| 2002/0098435 A1 | 7/2002 | Rohr et al. | |
| 2003/0215731 A1 * | 11/2003 | Saiki et al. | ............... 430/110.3 |

FOREIGN PATENT DOCUMENTS

| | | |
|---|---|---|
| CA | 2394808 | 6/2001 |
| DE | 4010606 | 10/1991 |
| DE | 4029652 | 3/1992 |
| DE | 4031705 | 4/1992 |
| DE | 4034305 | 4/1992 |
| DE | 4142541 | 6/1993 |
| DE | 4332170 | 3/1995 |
| DE | 4418842 | 12/1995 |
| DE | 19711260 | 9/1998 |
| DE | 19732995 | 2/1999 |
| EP | 0258651 | 3/1988 |
| EP | 0347695 | 12/1989 |
| EP | 0385580 | 9/1990 |
| EP | 0636945 | 2/1995 |
| EP | 0778501 | 6/1997 |

(Continued)

OTHER PUBLICATIONS

U.S. Appl. No. 11/596,639 by Michel et al., filed Nov. 14, 2006.
U.S. Appl. No. 11/628,912; by Michel, filed Dec. 7, 2007.
U.S. Appl. No. 10/523,502, by Michel et al., filed Feb. 2, 2005.
International Search Report for PCT/EP 03/07423, mailed Oct. 28, 2003.

(Continued)

Primary Examiner—Mark F Huff
Assistant Examiner—Rachel L Burney
(74) Attorney, Agent, or Firm—Anthony A. Bisulca; Richard P. Silverman

(57) ABSTRACT

Layered double hydroxide salts as charge control agents in electrophotographic toners and developers, in powder coating materials, electret materials and in electrostatic separation processes of chargeable materials, such as polymers, wherein the double hydroxide salt contains monovalent and/or divalent, and also trivalent, metal cations, and also contains one or more organic anions A of the formula (I)

$$X—R—Y \quad (1)$$

wherein
X is hydroxyl, carboxyl, sulfato or sulfo;
Y is carboxyl, sulfato or sulfo, and
R is an aliphatic, cycloaliphatic, heterocycloaliphatic, olefinic, cycloolefinic. heterocycloolefinic, aromatic, heteroaromatic, aralphatic or heteroaralphatic radical having a total of at least 8 carbon atoms which can be substituted by one or several substituents from the group hydroxyl, amino, halogen, $C_1$-$C_{22}$-alkyl, $C_1$-$C_{22}$-alkoxy, —$C_1$-$C_{22}$-alkylene-(CO)—O—($CH_2CH_2O$)$_{0-50}$-alkyl,—$C_1$-$C_{22}$-alkylene-(CO)—O—($CH_2H_2O$)$_{0-50}$-haloalkyl, carboxy, sulfo, nitro or cyano.

14 Claims, No Drawings

| | FOREIGN PATENT DOCUMENTS | |
|---|---|---|
| EP | 0957407 | 11/1999 |
| EP | 1204005 | 5/2002 |
| JP | 2003162145 A * | 6/2003 |
| WO | WO 9110172 | 7/1991 |
| WO | WO 9935185 | 7/1999 |
| WO | WO 01/30919 | 5/2001 |
| WO | WO 01/40878 | 6/2001 |

OTHER PUBLICATIONS

English Translation of IPER for PCT/EP 03/07423, mailed May 7, 2005.
English Abstract for JP Publication No. 05-163449, Jun. 29, 1993.
English Abstract for JP Publicvation No. 10-090941, Apr. 10, 1998.

* cited by examiner

USE OF SALTS OF LAYERED DOUBLE HYDROXIDES AS CHARGE CONTROL AGENTS

The present invention lies within the field of charge control agents, i.e., components which selectively influence electrostatic charging in a matrix.

In electrophotographic recording processes a latent charge image is produced on a photoconductor. This latent charge image is developed by applying an electrostatically charged toner which is then transferred to, for example, paper, textiles, foils or plastic and is fixed by means, for example, of pressure, radiation, heat or the action of solvent. Typical toners are one- or two-component powder toners (also known as one- or two-component developers); also used are specialty toners, such as magnetic toners, liquid toners or polymerization toners, for example. By polymerization toners are meant those toners which are formed by, for example, suspension polymerization (condensation) or emulsion polymerization and lead to improved particle properties in the toner. Also meant are those toners produced basically in nonaqueous dispersions.

One measure of the quality of a toner is its specific charge q/m (charge per unit mass). In addition to the sign and level of the electrostatic charge, important quality criteria are the rapid attainment of the desired charge level, the constancy of this charge over an extended activation period and the insensitivity of the toner to climatic effects, such as temperature and atmospheric humidity. Both positively and negatively chargeable toners are used in copiers and laser printers, depending on the type of process and type of apparatus.

To obtain electrophotographic toners or developers having either a positive or negative charge, it is common to add charge control agents. Since the charge of toner binders is often heavily dependent on the activation period, the function of a charge control agent is, on the one hand, to set the sign and level of the toner charge and, on the other hand, to counteract the charge drift of the toner binder and to provide for constancy of the toner charge. Another important practical requirement is that the charge control agents should have sufficient thermal stability and effective dispersibility. Typical temperatures at which charge control agents are incorporated into the toner resins, when using kneading apparatus or extruders, are between 100° C. and 200° C. Accordingly, thermal stability at 200° C. is of great advantage. It is also important for the thermal stability to be ensured over a relatively long period (about 30 minutes) and in a variety of binder systems.

For effective dispersibility it is of advantage for the charge control agent not to exhibit any waxlike properties or any tackiness and to have a melting or softening point of >150° C., better still >200° C. Tackiness frequently leads to problems in the course of metered addition to the toner formulation, and low melting or softening points may result in failure to achieve homogeneous distribution in the course of incorporation by dispersion, since the material amalgamates in the form of droplets in the carrier material.

Typical toner binders are addition polymerization, polyaddition and polycondensation resins, such as styrene, styrene-acrylate, styrene-butadiene, acrylate, polyester and phenol-epoxy resins, and also cycloolefin copolymers, individually or in combination, which may also include further components, examples being colorants, such as dyes and pigments, waxes or flow assistants, or may have these components added subsequently, such as highly disperse silicas.

Charge control agents may also be used to improve the electrostatic charge of powders and coating materials, especially in triboelectrically or electrokinetically sprayed powder coating materials as are used to coat surfaces of articles made from, for example, metal, wood, plastic, glass, ceramic, concrete, textile material, paper or rubber. The powder coating material, or the powder, receives its electrostatic charge, in general, by one of the two following methods:

In the case of the corona method, the powder coating material or powder is guided past a charged corona and is charged in the process; in the case of the triboelectric or electrokinetic method, the principle of frictional electricity is utilized.

It is also possible to combine the two methods. The powder coating material or powder in the spray apparatus receives an electrostatic charge which is opposite to the charge of its friction partner, generally a hose or spray pipe made, for example, from polytetrafluoroethylene.

Typical powder coating resins employed are epoxy resins, carboxyl- and hydroxyl-containing polyester resins, polyurethane resins and acrylic resins, together with the customary hardeners. Resin combinations are also used. For example, epoxy resins are frequently employed in combination with carboxyl- and hydroxyl-containing polyester resins.

It has additionally been found that charge control agents are able to improve considerably the charging and the charge stability properties of electret materials, especially electret fibers. Typical electret materials are based on polyolefins, halogenated polyolefins, polyacrylates, polyacrylonitriles, polystyrenes or fluoropolymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates, and mixtures thereof. Electret materials, especially electret fibers, can be used, for example, to filter (very fine) dusts. The electret materials can receive their charge by corona or triboelectric charging.

Additionally, charge control agents can be used in electrostatic separation processes, especially in processes for the separation of polymers. Without charge control agents, the triboelectric charging characteristics of low-density polyethylene (LDPE) and high-density polyethylene (HDPE) are extremely similar. Following the addition of charge control agent, LDPE takes on a highly positive and HDPE a highly negative charge, and the materials can thus be separated easily. In addition to the external application of the charge control agents it is also possible to incorporate them into the polymer in order, for example, to shift the position of the polymer within the triboelectric voltage series and to obtain a corresponding separation effect. In this way it is possible to separate other polymers as well, such as polypropylene (PP) and/or polyethylene terephthalate (PET) and/or polyvinyl chloride (PVC), from one another.

Salt minerals can likewise be separated if they are admixed beforehand (surface conditioning) with an agent which improves the substrate-specific electrostatic charging.

Charge control agents are employed, furthermore, as "electroconductivity providing agents" (ECPAs) (JP-05-163 449) in inks for inkjet printers.

Additionally said double hydroxides are suitable for use as charge control agents in color filters for additive or subtractive color generation, and also in electronic inks for electronic newspapers.

Charge control agents can be used additionally for the surface modification of freeflow agents, such as highly disperse silicas in their pyrogenic and precipitated forms, or metal oxides, such as titanium dioxide. In this case the effect is to optimize the physical properties, such as triboelectric charge behavior. Freeflow agents are metered into the toner subsequently, in order to produce better free-flow properties.

U.S. Pat. No. 5,288,581 uses certain hydrotalcites as charge control additives. JP 10-090 941 describes the use of a hydrophobicized hydrotalcite as an external additive in combination with a positive charge control agent. The primary purpose of that additive is to improve the free-flow properties of the toner.

The object of the present invention was to find effective and ecotoxicologically compatible charge control agents, featuring in particular a high level of rapid charging and high charge stability. Furthermore, these compounds should be readily dispersible, without decomposition, in various toner binders employed in practice, such as polyesters, polystyrene-acrylates or polystyrene-butadienes/epoxy resins and also cycloolefin copolymers. Furthermore, their action should be largely independent of the resin/carrier combination, in order to open up broad applicability. They should likewise be readily dispersible, without decomposition, in common powder coating binders and electret materials, such as polyesters (PES), epoxy, PES-epoxy hybrid, polyurethane, acrylic systems and polypropylenes.

In terms of their electrostatic efficiency the charge control agents should be active even at very low concentration (1% or less) and should not lose this efficiency when in conjunction with carbon black or other colorants. It is known of colorants that they can affect—in some cases lastingly—the triboelectric charging of toners.

Surprisingly it has now become evident that salts of layered double hydroxides described below have advantageous charge control properties, especially for negative charging, and high thermal stabilities, the charge control property being lost neither by combination with carbon black nor by combination with other colorants. Furthermore, the compounds are readily compatible with the customary toner, powder coating and electret binders and are easy to disperse.

The present invention provides for the use of layered double hydroxide salts as charge control agents in electrophotographic toners and developers, in powder coating materials, electret materials and in electrostatic separation processes of chargeable materials, such as polymers, wherein the double hydroxide salt contains monovalent and/or divalent, and also trivalent, metal cations, and also contains one or more organic anions A of the formula (I)

$$X—R—Y \quad (1)$$

in which

X is hydroxyl, carboxyl, sulfato or sulfo;

Y is carboxyl, sulfato or sulfo, and

R is an aliphatic, cycloaliphatic, heterocycloaliphatic, olefinic, cycloolefinic, heterocycloolefinic, aromatic, heteroaromatic, araliphatic or heteroaraliphatic radical having a total of at least 8 carbon atoms, e.g., 8 to 50 carbon atoms, especially 10 to 44 carbon atoms, more preferably 10 to 32 carbon atoms, it being possible for there to be one or more, preferably 1, 2, 3 or 4, substituents from the group hydroxyl, amino, halogen, $C_1$-$C_{22}$-alkyl, $C_1$-$C_{22}$-alkoxy, —$C_1$-$C_{22}$-alkylene-(CO)—O—$(CH_2CH_2O)_{0-50}$-alkyl, —$C_1$-$C_{22}$-alkylene-(CO)—O—$(CH_2CH_2O)_{0-50}$-haloalkyl, carboxy, sulfo, nitro or cyano.

In said double hydroxide salt the number of hydroxyl groups is approximately from 1.8 to 2.2 times, preferably about 2 times, the sum of all the metal cations. The molar ratio of the monovalent and/or divalent metal cations to the trivalent metal cations can be between $10^4$ and $10^{-4}$, preferably between 10 and 0.1, in particular between 5 and 0.2.

The ratio of the monovalent to the divalent metal cations can be arbitrary, but it is preferred for double hydroxide salts to be present which besides the trivalent metal cations contain exclusively divalent metal cations or a mixture of monovalent and divalent metal cations.

A can be a singly or multiply charged organic anion of the formula (1). The amount of the anions A is determined by the stoichiometry of the positive and negative charges in the double hydroxide salt such that the sum of all charges produces zero. It is, however, possible for some of the anions of the formula (1), for example, from 0.1 to 99 mol %, in particular from 1 to 90 mol %, to be replaced by other anions, such as inorganic anions, for example, such as halide, hydrogencarbonate, carbonate, sulfate, nitrate, phosphate, or borate or acetate.

The double hydroxide salts used in accordance with the invention may also contain water molecules in the form of water of crystallization or intercalated between individual layers.

Suitable monovalent metal cations include particularly alkali metal cations, such as $Li^+$, $Na^+$ or $K^+$.

Suitable divalent metal cations include particularly $Mg^{2+}$, $Ca^{2+}$, $Zn^{2+}$, $Co^{2+}$, $Ni^{2+}$, $Fe^{2+}$, $Cu^{2+}$ or $Mn^{2+}$.

Suitable trivalent metal cations include particularly $Al^{3+}$, $Fe^{3+}$, $Co^{3+}$, $Mn^{3+}$, $Ni^{3+}$, $Cr^{3+}$ and $B^{3+}$.

Particularly preferred double hydroxide salts are those containing $Mg^{2+}$ and $Al^{3+}$, especially in a molar ratio of from 3.1:1 to 1:2. Suitable organic anions A include preferably those from the group of benzilic acid, naphthalenedisulfonic acids, e.g. naphthalene-1,5-disulfonic acid, naphthalenedicarboxylic acids, hydroxynaphtholic acids, e.g., 1-hydroxy-2-naphthoic acid, 2-hydroxy-1-naphthoic acid, 3-hydroxy-2-naphthoic acid, octanedicarboxylic acid, decanedicarboxylic acid (sebacic acid), dodecanedicarboxylic acid, tetradecanedicarboxylic acid, hexadecanedicarboxylic acid, octadecanedicarboxylic acid, naphthalenetetracarboxylic acid, sulfosuccinic acid $(C_6$-$C_{20})$-alkyl monoesters, sulfosuccinic acid $(C_6$-$C_{22})$-fluoroalkyl monoesters.

It is, however, also possible for some, for example, from 0.1 to 99.9 mol %, preferably 0.2 to 99.8 mol %, of the organic anions A to be replaced by other organic anions A', A' corresponding to the formula H—R—Y and both R and Y in this formula having the same definition as described for formula (1), such as, for example, $C_{12}$-$C_{44}$ fatty acids, especially stearic acid.

Particularly preferred double hydroxide salts are those having a molar ratio Mg:Al of from 3.1:1 to 1:2, and with sebacic acid as the organic anion in each case, and also the calcined forms thereof.

Starting products for double hydroxides for the purposes of the present invention are hydrotalcites, which are mostly available commercially and contain an inorganic anion, mostly carbonate. Hydrotalcites per se and also hydrophobicized forms are described for example in DE-A-40 10 606 and in DE-A-40 34 305. By means of suitable methods, such as reaction in aqueous, organic, e.g., alcoholic, or aqueous-organic suspension with the corresponding organic anions, in the form for example of their salts, the double hydroxide salts used in accordance with the invention can be prepared from these commercial products.

The salts of layered double hydroxides are prepared advantageously in an aqueous medium at a pH of from 3 to 14 and at a temperature of between 0 and 100° C., preferably with stirring and where appropriate under pressure as well. The preparation can also take place where appropriate under autoclave conditions, i.e., under pressures of between 1.1 and 1000 bar, preferably between 1.1 and 500 bar, in particular between 1.1 and 200 bar, and at temperatures between 20 and 200° C., preferably between 30 and 190° C., in particular between 40 and 180° C. Preparation may also take place under the described conditions in organic solvents, such as alcohols and ketones, and also in mixtures of water and one or more organic solvents in any ratio. The organic anion or anions used can be employed in equimolar amounts, although a deficit of 0.1 to 99.9% is also possible. The organic anions can be used directly in salt form, for example, as the sodium or potassium salt, or else as the acid in the protonated form, and in the latter case it may be necessary to adjust the pH by means of a base such as sodium or potassium hydroxide or carbonate, for example, in order to ensure a better distribution of the acid in the aqueous medium. The organic anions A and A' may additionally be used as acid halides, for example, as acid chlorides, as acid anhydrides, as acid azides or esters of acids. This applies in particular for preparation in organic solvents.

In one preferred embodiment the hydrotalcite is calcined, i.e., heated to a temperature of 150 to 1000° C., where appropriate under reduced or elevated pressure. For the preparation of the compounds described in accordance with the invention it may also be of advantage to dry the layered double hydroxides used, prior to the reaction, by means for example of heating at 150° C. for a number of hours.

The compounds described in accordance with the invention can also be prepared by direct reaction of the calcined or uncalcined double hydroxides with the corresponding organic acids or salts thereof, with heating, in a mixing apparatus, such as in a kneading apparatus, extruder, dissolver, bead mill, Henschel mixer or other mill, for example. Also possible is preparation by reacting salts of the double-hydroxide-building metal cations, such as magnesium chloride and aluminum chloride, in aqueous alkali metal hydroxide solution, with the acid or the salt of the organic anions A and, where appropriate, A'.

Magnesium aluminum hydroxide carbonates with an Mg to Al ratio of from 1.9:1 to 3.1:1 which contain more than zero and less than 10% by weight, e.g., 0.1 to 9.9% by weight, preferably 0.5 to 9.5% by weight, based on their total weight, of anions of sebacic acid are novel and are also particularly preferred for the purposes of the present invention. Likewise novel and particularly preferred for the purposes of the present invention are magnesium aluminum hydroxide carbonates having an Mg to Al ratio of from 1.9:1 to 3.1:1 and containing 0.5 to 70% by weight, preferably 0.5 to 50% by weight, in particular 1 to 45% by weight, based on their total weight, of a combination of anions of sebacic acid and anions of one or more $C_{12}$-$C_{44}$ fatty acids, especially stearic acid; or a combination of anions of sebacic acid and anions of a partly fluorinated or perfluorinated sulfosuccinic acid ($C_6$-$C_{22}$)-alkyl monoester; or anions of a partly fluorinated or perfluorinated sulfosuccinic acid ($C_6$-$C_2$)alkyl monoester. Of especial interest in this context are compounds of the formulae

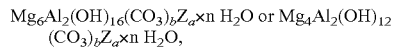

$Mg_6Al_2(OH)_{16}(CO_3)_bZ_a \times n\ H_2O$ or $Mg_4Al_2(OH)_{12}(CO_3)_bZ_a \times n\ H_2O$, where b is zero to 1, n is zero to 10, Z is a combination of anions of sebacic acid and anions of one or more $C_{12}$-$C_{44}$ fatty acids, especially stearic acid, and the number a is such that Z accounts for 0.5 to 50% by weight, preferably 1 to 45% by weight, based on the total weight of the compound. The mutual ratio between sebacic acid and fatty acid and/or sulfosuccinic acid monoesters can be from 1:100 to 10:1, preferably 1:50 to 5:1. In the case of the calcined compounds n is zero to 2.

The novel compounds described above can be prepared in the same way as described before. In the case of the preparation of the compounds which contain an anion combination of sebacic acid and one or more fatty acids, the sebacic acid and the corresponding acids or the respective salts can be reacted simultaneously or in succession or in any desired sub-combinations thereof. It may, however, sometimes be advantageous first to react the sebacic acid or salts thereof and then to add the other anion or anions to the reaction mixture.

The salts of layered double hydroxides used in accordance with the invention can be matched precisely to the particular resin/toner system. A further technical advantage of these compounds is that they are inert toward the various binder systems and can therefore be employed diversely, it being particularly significant that they are not dissolved in the polymer matrix but rather are present as small, very finely divided solid structures. Furthermore, they exhibit high and often very constant charge control properties and also very good thermal stabilities. Moreover, the double hydroxides used in accordance with the invention are free-flowing and possess effective dispersibility.

Dispersion means the distribution of one substance within another, i.e. in the context of the invention the distribution of a charge control agent in the toner binder, powder coating binder or electret material. It is known that crystalline substances in their coarsest form are present as agglomerates. To achieve homogeneous distribution within the binder, these agglomerates must be disrupted by the dispersing operation into smaller aggregates or, ideally, into primary particles. The particles of charge control agent present in the binder following dispersion should be smaller than 1 µm, preferably smaller than 0.5 µm, with a narrow particle size distribution being of advantage. For the particle size, defined by the $d_{50}$ value, there are optimum ranges of activity depending on the material. For instance, coarse particles (1 mm) can in some cases not be dispersed at all or can be dispersed only with considerable investment of time and energy, whereas very fine particles in the submicron range harbor a heightened safety risk, such as the possibility of dust explosion.

The particle size and form is established and modified either by the synthesis and/or by aftertreatment. The required property is frequently possible only through controlled aftertreatment, such as milling and/or drying. Various milling techniques are suitable for this purpose. Examples of advantageous technologies are airjet mills, cutting mills, hammer mills, bead mills and impact mills.

The binder systems mentioned in connection with the present invention are, typically, hydrophobic materials. High levels of water in the charge control agent can either oppose wetting or else promote dispersion (flushing). The practicable moisture content is therefore specific to the particular material.

The compounds of the invention feature the following chemical/physical properties:

The water content, determined by the Karl-Fischer method, is mostly between 0.001 and 30%, preferably between 0.01 and 25% and, with particular preference, between 0.1 and 15%, it being possible for the water to be in adsorbed and/or bonded form, and for its proportion to be adjusted by the action of heat at up to 200° C. and reduced pressure down to $10^{-8}$ torr or by addition of water, or by storage under defined air humidity conditions. Surprisingly the compounds used in accordance with the invention, containing one or more above-defined organic anions, exhibit no particular increase in $H_2O$ content (Karl-Fischer method) following 48 h storage at 90% relative air humidity at 35° C. in a conditioning test cabinet, while the analogous double hydroxides with inorganic anions have much higher $H_2O$ contents, in some cases a multiple of that prior to conditioning storage.

The particle size, determined by means of evaluation by light microscope or by laser light scattering, and defined by the $d_{50}$ value, is between 0.01 µm and 1000 µm, preferably between 0.1 and 500 µm, and with very particular preference between 0.5 and 400 µm. It is particularly advantageous if milling results in a narrow particle size. Preference is given to a range $\Delta(d_{95}-d_{50})$ of less than 500 µm, in particular less than 400 µm. The conductivity of the 5% aqueous dispersion is between 0.001 and 2000 mS, preferably between 0.01 and 100 mS. The compounds of the invention contain predominantly crystalline fractions but also amorphous fractions. The compounds used in accordance with the invention, incorporated into a toner binder, show a temperature stability up to 200° C. (no discoloration) in a thermal gradient test (Kofler test).

In the case of electrokinetic surface potential determination by means of SCD (streaming current detection), the compounds used in accordance with the invention surprisingly exhibit much lower surface potentials (positive or negative sign) than the corresponding double hydroxides with inorganic anions. When these compounds are titrated with corresponding surface-active reagents to the zero point of the surface potential (SCD monitoring of the titration), the amount of surface-active reagent required in the case of the compounds with inorganic anions is significantly higher than in the case of the corresponding double hydroxides with organic anions. This points to a relatively high stability of the salt bond between double hydroxide and organic anion.

The salts of layered double hydroxides employed in accordance with the invention can also be combined with further positive or negative charge control agents in order to obtain good performance chargeabilities, the overall concentration of the charge control agents being advantageously between 0.01 and 50% by weight, preferably between 0.05 and 20% by weight, with particular preference between 0.1 and 5% by weight, based on the overall weight of the electrophotographic toner, developer, powder or powder coating material.

Examples of suitable further charge control agents are: triphenylmethanes; ammonium and immonium compounds, iminium compounds; fluorinated ammonium and fluorinated immonium compounds; biscationic acid amides; polymeric ammonium compounds; diallylammonium compounds; aryl sulfide derivatives, phenol derivatives; phosphonium compounds and fluorinated phosphonium compounds; calix[n] arenes, cyclically linked oligosaccharides (cyclodextrins) and their derivatives, especially boron ester derivatives, interpolyelectrolyte complexes (IPECs); polyester salts; metal complex compounds, especially salicylate-metal complexes and salicylate-nonmetal complexes, salts of ionic structured silicates, hydroxycarboxylic acid-metal complexes and hydroxycarboxylic acid-nonmetal complexes, benzimidazolones; azines, thiazines or oxazines, which are listed in the Colour Index as Pigments, Solvent Dyes, Basic Dyes or Acid Dyes.

Particular preference is given to the charge control agents specified below, which can be combined individually or in combination with one another with the double hydroxides used in accordance with the invention: triphenylmethanes, as described for example in U.S. Pat. No. 5,051,585; ammonium and immonium compounds, as described for example in U.S. Pat. No. 5,051,676; fluorinated ammonium and fluorinated immonium compounds, as described for example in U.S. Pat. No. 5,069,994; biscationic acid amides, as described for example in WO 91/10172; diallylammonium compounds, as described for example in DE-A-4 142 541, DE-A-4 029 652 or DE-A4 103 610; alkyl sulfide derivatives, as described for example in DE-A-4 031 705; phenol derivatives, as described for example in EP-A-0 258 651; phosphonium compounds and fluorinated phosphonium compounds, as described for example in U.S. Pat. Nos. 5,021,473 and 5,147,748; calix[n] arenes, as described for example in EP-A-0 385 580; benzimidazolones, as described for example in EP-A-0 347 695; cyclically linked oligosaccharides, as described for example in DE-A 4 418 842; polyester salts, as described for example in DE-A-4 332 170; cyclooligosaccharide compounds, as described for example in DE-A-197 11 260; interpolyelectrolyte complexes, as described for example in DE-A-197 32 995; salts of ionic structured silicates, as described for example in PCT/EP00/11217. Also suitable, especially for liquid toners, are surface-active, ionic compounds and those known as metal soaps.

Particularly suitable are alkylated arylsulfonates, such as barium petronates, calcium petronates, barium dinonylnaphthalenesulfonates (basic and neutral), calcium dinonylsulfonate or Na dodecylbenzenesulfonate, and polyisobutylene-succinimides (Chevron's Oloa 1200). Also suitable are soya lecithin and N-vinylpyrrolidone polymers. Also suitable are sodium salts of phosphated monoglycerides and diglycerides with saturated and unsaturated substituents, AB diblock copolymers of A: polymers of 2-(N;N)di-methylaminoethyl methacrylate quaternized with methyl p-toluenesulfonate, and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron naphthalite and zinc naphthalite. Also suitable are chelating charge control agents (EP 0 636 945 A1), metallic (ionic) compounds (EP 0 778 501 A1), phosphate metal salts, such as described in JA 9 (1997)-106107. Also suitable are azines of the following Colour Index Numbers: C.I. Solvent Black 5, 5:1, 5:2, 7, 31 and 50; C.I. Pigment Black 1, C.I. Basic Red 2 and C.I. Basic Black 1 and 2.

The layered double hydroxides used in accordance with the invention are incorporated individually or in combination with one another or with further charge control agents, mentioned above, in a concentration of from 0.01 to 50% by weight, preferably from 0.05 to 20% by weight, with particular preference from 0.1 to 5.0% by weight, based on the overall mixture, into the binder of the respective toner, developer, coating material, powder coating material, electret material or of the polymer which is to be electrostatically separated, said incorporation being homogeneous and taking place, for example, by means of extrusion or kneading, bead-milling or using an Ultraturrax (high-speed stirrer). In this context the compounds employed in accordance with the invention can be added as dried and milled powders, dispersions or solutions, presscakes, masterbatches, preparations, made-up pastes, as compounds applied from aqueous or non-aqueous solution to appropriate carriers such as silica gel, $TiO_2$, $Al_2O_3$ or carbon black, for example, or mixed with such carriers, or added in some other form. Similarly, the compounds used in accordance with the invention can also in principle be added even during the preparation of the respective toner polymer matrices, i.e., in the course of their addition polymerization, polyaddition or polycondensation, and also in the preparation of polymerization toners, during the suspension or emulsion polymerization or in the aggregation of the polymer systems to toner particles, for example.

The charge control agents of the invention can also be used in the form of fine aqueous, aqueous-organic or organic dispersions. The particle sizes ($d_{50}$ values) are between 20 nm and 1 µm, preferably between 50 and 500 nm. Advantageous concentrations of charge control agents are between 0.01% and 50% by weight, preferably between 0.1% and 30% by weight, based on the total weight of the dispersion. The viscosity of such a dispersion is advantageously between 0.5 and $10^6$ mPa s, preferably between 1 and 5000 mPa s. In the case of aqueous or aqueous-organic dispersions it is preferred to use water in the form of distilled or deionized water. In the case of organic or aqueous-organic dispersions the organic medium used comprises one or more organic solvents, preferably from the group of monohydric or polyhydric alcohols, their ethers and esters, e.g., alkanols, particularly those having 1 to 4 carbon atoms, such as methanol, ethanol, propanol, isopropanol, butanol and isobutanol, for example; dihydric or trihydric alcohols, especially those having 2 to 6 carbon atoms, examples being ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol and polypropylene glycol; lower alkyl ethers of polyhydric alcohols, such as ethylene glycol monomethyl or ethyl or butyl ether, triethylene glycol monomethyl or ethyl ether; ketones and ketone alcohols, such as acetone, methyl ethyl ketone, diethyl ketone, methyl isobutyl ketone, methyl pentyl ketone, cyclopentanone, cyclohexanone and diacetone alcohol; and amides, such as dimethylformamide, dimethylacetamide and N-methylpyrrolidone, for example. For the preparation of stable dispersions it is possible in addition to use customary ionic or nonionic dispersing assistants which are of polymeric or of low molecular mass, examples being sulfates, sulfonates, phosphates, polyphosphates, carbonates, carboxylates, carboxylic acids, silicates, hydroxides, metal soaps, polymers, such as acrylates, fatty acid derivatives and glycoside compounds. The dispersions may further comprise metal complexing agents, such as EDTA or NTA, for example.

The dispersions may further comprise customary additives as well, examples being preservatives, biocides, antioxidants, cationic, anionic, amphoteric or nonionic surface-active substances (surfactants and wetting agents), devolatilizers/defoamers, and viscosity regulators, e.g., polyvinyl alcohol, cellulose derivatives or water-soluble natural or synthetic resins and polymers as film formers, or binders for increasing the adhesion and abrasion resistance. pH regulators employed include organic or inorganic bases and acids. Preferred organic bases are amines, such as ethanolamine, diethanolamine, triethanolamine, diethylaminoethanol (DEAE), N,N-dimethylethanolamine, diisopropylamine, aminomethylpropanol or dimethylaminomethylpropanol. Preferred inorganic bases are sodium, potassium or lithium hydroxide or ammonia. Further constituents may be hydrotropic compounds, such as formamide, urea, tetramethylurea, ε-caprolactam, ethylene glycol, diethylene glycol, triethylene glycol, polyethylene glycol, butyl glycol, methyl cellosolve, glycerol, sugars, N-methylpyrrolidone, 1,3-diethyl-2-imidazolidinone, thiodiglycol, sodium benzenesulfonate, Na xylenesulfonate, Na toluenesulfonate, Na cumenesulfonate, Na benzoate, Na salicylate or Na butyl monoglycol sulfate. The concentration of these dispersing assistants and/or customary additives in the dispersion is advantageously between 0.001% and 80% by weight, preferably between 0.01% and 50% by weight, based on the total weight of the dispersion.

In order to prepare electrophotographic color toners colorants are added such as organic chromatic pigments, inorganic pigments or dyes, usually in the form of powders, dispersions, presscakes, solutions or masterbatches. The organic chromatic pigments can be from the group of the azopigments or polycyclic pigments or can be mixed crystals (solid solutions) of such pigments.

Preferred blue pigments and/or green pigments are copper phthalocyanines, such as C.I. Pigment Blue 15, 15:1, 15:2, 15:3, 15:4, 15:6, P. Blue 16 (metal-free phthalocyanine), or phthalocyanines with aluminum, nickel, iron or vanadium as the central atom, and also triarylcarbonium pigments, such as Pigment Blue 1, 2, 9, 10, 14, 16, 56, 60, 61, 62, 68, 80; Pigment Green 1, 4, 7, 17, 36, 50 45; orange pigments, such as P.O. 5, 13, 34, 36, 38, 43, 62, 68, 70, 72, 71, 74; yellow pigments, such as P.Y. 12, 13, 14, 17, 74, 83, 93, 97, 111, 120, 122, 139, 151, 154, 155, 174, 175, 176, 180, 174, 185, 194, 213, 214; red pigments, such as P.R. 2, 3, 4, 5, 9, 38, 48, 53, 57, 112, 122, 144, 146, 147, 149, 168, 170, 175, 176, 177, 179, 181, 184, 185, 186, 188, 189, 202, 207, 208, 209, 210, 214, 219, 238, 253, 254, 255, 256, 257, 266, 269, 270, 272, 279; violet pigments such as P.V. 1, 19, 23, 32; carbon blacks such as P. Black 7, 11, 33 or in their surface-modified form as described in U.S. Pat. No. 5,554,739, iron/manganese oxides; and also mixed crystals such as those, for example, of pigments described above such as C.I. Pigment Violet 19 and C.I. Pigment Red 122, and also azo-surface-modified pigments as described in WO 01/30919.

The mixtures can be prepared in the form of powders, granules, by mixing presscakes, spray-dried presscakes or masterbatches and also by dispersing (extrusion, kneading, roll-mill processes, bead mills, Ultraturrax, ultrasound) in the presence of a carrier material in solid or liquid form (aqueous and nonaqueous inks) and also by flushing in the presence of a carrier material. Where the colorant is used with high proportions of water or solvent (>5%) mixing can also take place at elevated temperatures, by subsequent cooling of the mixture mass and with vacuum assistance. The flushing operation can take place in the presence or absence of organic solvents and of waxes.

Particularly appropriate for increasing the brightness but also for shading the hue are mixtures with organic dyes. Preferred such dyes include the following: Water-soluble dyes, such as Direct, Reactive and Acid Dyes, and also solvent-soluble dyes, such as Solvent Dyes, Disperse Dyes and Vat Dyes. Examples include the following: C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, Solvent Black 45, 27. It is also possible to use dyes and pigments having fluorescent properties, such as ®Luminols (Riedel-de Haen), in order for example to produce anticounterfeit toners. Additionally the colorants may also be used in a special wax-coated form, as described in EP-A-1 204 005, in combination with the charge control agents of the invention.

Inorganic pigments, such as $TiO_2$ or $BaSO_4$ for example, are used in mixtures for lightening. Also suitable are mixtures with effect pigments, such as pearlescent pigments, $Fe_2O_3$ pigments (®Paliocroms), and pigments based on cholesteric polymers, which exhibit different colors depending on the angle of observation.

Electrophotographic toners and also powdercoating materials may further comprise waxes. The term "wax" denotes a range of substances, naturally or synthetically obtained, which generally have the following properties: they are kneadable at 20° C., range from firm to hard and fragile, from coarse to finely crystalline, and from translucent to opaque, but not glasslike; they melt without decomposition above 40°

C., are of relatively low viscosity, without stringing, at just a little above the melting point, have a highly temperature-dependent consistency and solubility, and can be polished under gentle pressure (cf. Ullmanns Enzyklopädie der technischen Chemie, Volume 24, 4th Edition 1983, pp. 1-49, Verlag Chemie, Weinheim and Römpps Chemie-Lexikon, Volume 6, 8th Edition 1988, p. 463, Franck'sche Verlagshandlung).

The following waxes are preferred: natural waxes, such as plant waxes, e.g., carnauba wax, candellila wax, and animal waxes, e.g., beeswax, modified natural waxes, such as paraffin waxes, microwaxes, semisynthetic waxes, such as montan ester waxes, or synthetic waxes, such as polyolefin waxes, e.g., polyethylene and polypropylene waxes, polyethylene glycol waxes, cycloolefin copolymer waxes, amide waxes, such as N,N'-distearylethylenediamine, zirconocene waxes, and chlorinated or fluorinated polyolefin waxes or polyethylene-polytetrafluoroethylene wax mixtures.

Particular preference is given to polyolefin waxes, and also to polyolefin waxes containing polar groups, formed by subsequent oxidation of the polyolefin wax, by grafting reaction with monomers containing carboxylic acid, carboxylic ester, carboxylic anhydride or hydroxyl groups or by copolymerization from an olefin and a monomer containing carboxylic acid, carboxylic ester, carboxamido, carboxylic anhydride or hydroxyl groups.

Waxes in the context of the present invention may also be compounds of relatively high molecular mass which have a waxlike character and have been prepared preferably by polycondensation, polyaddition or addition polymerization processes, examples being thermoplastic polyester resins, epoxy resins, styrene-acrylate copolymer resins, styrene-butadiene copolymer resins and cycloolefin copolymer resins, such as ®Topas, for example. In order to possess sufficient solubility at elevated temperature in organic solvents such polymers generally possess a number-average molecular weight ($\overline{M}_n$) of from 500 up to 20 000. Preferred waxes are those having a number-average molecular weight ($\overline{M}_n$) of from 800 up to 10 000, particular preference being given to those having a number-average molecular weight ($\overline{M}_n$) of from 1000 up to 5000.

The dropping point of the waxes used in accordance with the invention or the softening temperature of said waxlike polymers is preferably in the range from 20 to 180° C., more preferably in the range from 30 to 140° C.

The present invention also provides an electrophotographic toner, powder or powdercoating material containing from 30% to 99.99% by weight, preferably from 40% to 99.5% by weight, of a customary binder, such as a styrene, styrene-acrylate, styrene-butadiene, acrylate, urethane, acrylic, polyester or epoxy resin or a combination of the last two, from 0.01% to 50% by weight, preferably from 0.05% to 20% by weight, more preferably from 0.1% to 5% by weight, of at least one salt of layered double hydroxides, as described above, and, if desired, from 0.001% to 50% by weight, preferably from 0.05% to 20% by weight, of a colorant, based in each case on the total weight of the electrophotographic toner, powder or powdercoating material.

The compounds described in accordance with the invention may also be applied to free-flow agents as an additional charge control agent in suspended form or in a dry blend. The compounds described in accordance with the invention can also be used for a carrier coating.

In the examples which follow, parts and percentages are by weight.

PREPARATION EXAMPLE 1

10 g of Mg—Al hydroxide carbonate (stoichiometric Mg:Al ratio=2:1) (Syntal HSA 696, Südchemie, Germany) are dispersed by stirring in 100 ml of deionized water at 60 to 80° C. for 1 hour. Then a solution of 1.5 g of sebacic acid in 100 ml of deionized water is prepared with the addition of sodium hydroxide to a pH of approximately 8 and is added to the Mg—Al hydroxide carbonate suspension. The mixture is stirred at 70° C. for 6 hours, the suspension is filtered, the solid product is washed repeatedly with deionized water and then the washed solid is dried in vacuo at 60-80° C.

| | |
|---|---|
| Characterization: | white powder |
| DSC: | no decomposition up to 400° C. |
| pH: | 8.9 |
| Conductivity: | 250 µS/cm |
| Residual moisture content: | 5.6% |
| tan δ (1 kHz): | 0.5 |
| Ω cm: | $2 \times 10^8$ |
| Solubilities: | <1 g/l (20° C.) in water, ethanol, acetone, dimethyl sulfoxide, n-hexane |
| Particle size distribution: | $d_{50} = 15$ µm, $d_{95} = 39$ µm (laser light diffraction) |

PREPARATION EXAMPLE 2

10 g of calcined Mg—Al hydroxide carbonate (stoichiometric Mg:Al ratio=2:1) (Syntal HSAC 701, Südchemie, Germany) are dispersed by stirring in 100 ml of deionized water at 60° C. for 1 hour. Then a solution of 1.5 g of sodium 2-hydroxy-1-naphthoate in 100 ml of deionized water is prepared and is added to the Mg—Al hydroxide carbonate suspension. The mixture is stirred at 80° C. for 30 hours, the suspension is filtered, the solid product is washed repeatedly with deionized water and then the washed solid is dried in vacuo at 70° C.

The compounds listed in the table below are prepared analogously: Preparation examples 3 to 9:

| Ex. No. | Double hydroxide | Anion A |
|---|---|---|
| 3 | Syntal HSAC 701 (calcin.) | benzilic acid |
| 4 | Syntal HSAC 701 (calcin.) | naphthalene-1,5-disulfonic acid |
| 5 | Syntal HSAC 701 (calcin.) | 1-hydroxy-2-naphthoic acid |
| 6 | Syntal HSAC 701 (calcin.) | 2-hydroxy-1-naphthoic acid |
| 7 | Syntal HSAC 701 (calcin.) | sebacic acid |
| 8 | Syntal HSA 696 | sebacic acid |
| 9 | Syntal HSA 696 | naphthalene-1,5-disulfonic acid |

PREPARATION EXAMPLE 10

10 g of Mg—Al hydroxide carbonate of the formula $Mg_4Al_2(OH)_{12}CO_3$ aq. (Pural MG 61 HT, Sasol, Germany) are dispersed by stirring in 100 ml of deionized water at room temperature for 15 minutes. Then a solution of 1.0 g of sebacic acid in 100 ml of deionized water is prepared with the addition of sodium hydroxide to a pH of approximately 9 and is added to the Mg—Al hydroxide carbonate suspension. The mixture is stirred at 80° C. for 6 hours, the suspension is filtered, the solid product is washed repeatedly with deionized water and then the washed solid is dried in vacuo at 70° C.

Characterization, Preparation Example 10:

| | |
|---|---|
| Appearance: | white powder |
| DSC: | no decomposition up to 400° C. |
| pH: | 7.2 |
| Conductivity: | 50 µS/cm |
| Residual moisture content: | 1.4% |
| tan δ (1 kHz): | 4.6 |
| Ω cm: | $2 \times 10^7$ |
| Crystallinity: | very high, numerous peaks between 2 theta 2 and 50° (main peaks: 11.7°; 23.5°; 34.6°; 35.6°; 38.8°; 46.0°; 46.9°); |
| BET | 12 m²/g |
| Particle size distribution: | $d_{50} = 14$ µm, $d_{95} = 37$ µm (laser light diffraction) |
| Solubilities: | <1 g/l (20° C.) in water, ethanol, acetone, dimethyl sulfoxide, n-hexane |
| C content (elemental analysis): | 2.66% (corresponding to 4.4% by weight of sebacic acid) |

The compounds listed in the table below are prepared analogously: preparation examples 11 and 12:

| | | |
|---|---|---|
| 11 | Pural MG 30, Sasol (Mg:Al = 1:2) | sebacic acid |
| 12 | Pural MG 50, Sasol (Mg:Al = 5:4) | sebacic acid |

PREPARATION EXAMPLE 13

10 g of Mg—Al hydroxide carbonate of the formula $Mg_6Al_2(OH)_{16}CO_3$ aq. (Pural MG 70, Fa. Sasol, Germany) are dispersed by stirring in 100 ml of deionized water at 60° C. for 15 minutes. Then a solution of 1.25 g of sebacic acid in 100 ml of deionized water is prepared with the addition of sodium hydroxide to a pH of approximately 8-9 and is added to the Mg—Al hydroxide carbonate suspension. The mixture is stirred at 60° C. for 4 hours, the suspension is filtered, the solid product is washed repeatedly with deionized water and then the washed solid is dried in vacuo at 60° C.

Characterization, Preparation Example 13:

| | |
|---|---|
| Appearance: | ivory powder |
| DSC: | no decomposition up to 400° C. |
| pH: | 7.5 |
| Conductivity: | 125 µS/cm |
| Residual moisture content: | 3.4% |
| tan δ (1 kHz): | 0.93 |
| Ω cm: | $6 \times 10^7$ |
| Crystallinity: | very high, numerous peaks between 2 theta 2 and 50° (main peaks: 11.4°; 22.9°; 34.4°; 38.4°; 45.2°; 46.3°); |
| BET | 19.8 m²/g |
| Particle size distribution: | $d_{50} = 18$ µm, $d_{95} = 42$ µm (laser light diffraction) |
| Solubilities: | <1 g/l (20° C.) in water, ethanol, acetone, dimethyl sulfoxide, n-hexane |
| C content (elemental analysis): | 2.7% (corresponding to 4.5% of sebacic acid) |

PREPARATION EXAMPLE 13a

The procedure for preparation example 13 is repeated but using instead of sebacic acid 1.5 g of dried Fluowet SB liq. (commercial product of Clariant GmbH, Germany, dried in vacuo at 80° C./24 h; corresponds to $(C_6-C_{22})$-fluoroalkyl-sulfo-succinic acid monoester disodium salt).

Yield: 11.3 g of a white powder.

PREPARATION EXAMPLE 14

10 g of Mg—Al hydroxide carbonate of the formula $Mg_4Al_2(OH)_{12}CO_3$ aq. (Pural MG 61 HT, Sasol, Germany) are dispersed by stirring in 100 ml of deionized water at 60° C. for 15 minutes. Then a solution of 1.5 g of sebacic acid in 50 ml of deionized water is prepared with the addition of sodium hydroxide to a pH of approximately 9 and is added to the Mg—Al hydroxide carbonate suspension. Subsequently a solution of 2 g of stearic acid in a mixture of 50 ml of deionized water and 50 ml of isopropanol is prepared with the addition of sodium hydroxide to a pH of approximately 12 and heating to 70° C. and is added to the reaction mixture. The total mixture is stirred at 80° C. for 6 hours, the pH being held continuously at approximately 9, and then the suspension is filtered, the solid product is washed repeatedly with deionized water and then the washed solid is dried in vacuo at 70° C.

Characterization, Preparation Example 14:

| | |
|---|---|
| Appearance: | white powder |
| DSC: | no decomposition up to 400° C. |
| pH: | 8.6 |
| Conductivity: | 275 µS/cm |
| Residual moisture content: | 1.1% |
| tan δ (1 kHz): | 0.19 |
| Ω cm: | $6.0 \times 10^{10}$ |
| DE number (1 kHz): | 7.4 |
| Crystallinity: | very high, numerous peaks between 2 theta 2 and 50° (main peaks: 3.4°; 5.1°; 5.8°; 11.7°; 23.5°; 34.6°; 35.6°; 38.9°; 39.4°; 46.0°); |
| BET | 12.8 m²/g |
| Particle size distribution: | $d_{50} = 13$ µm, $d_{95} = 31$ µm (laser light diffraction) |
| C content (elemental analysis): | 11.88% |

PREPARATION EXAMPLE 15

10 g of Mg—Al hydroxide carbonate of the formula $Mg_6Al_2(OH)_{16}CO_3$ aq. (Pural MG 70, Sasol, Germany) are dispersed by stirring in 100 ml of deionized water at 70° C. for 15 minutes. Then a solution of 1.5 g of sebacic acid in 50 ml of deionized water is prepared with the addition of sodium hydroxide to a pH of approximately 9 and is added to the Mg—Al hydroxide carbonate suspension. Subsequently a solution of 2 g of stearic acid in a mixture of 50 ml of deionized water and 50 ml of isopropanol is prepared with the addition of sodium hydroxide to a pH of approximately 12 and heating to 70° C. and is added to the reaction mixture. The total mixture is stirred at 80° C. for 5 hours, and then the suspension is filtered, the solid product is washed repeatedly with deionized water and then the washed solid is dried in vacuo at 60° C.

Characterization, Preparation Example 15:

| | |
|---|---|
| Appearance: | white powder |
| DSC: | no decomposition up to 400° C. |
| pH: | 8.3 |
| Conductivity: | 325 µS/cm |

-continued

| | |
|---|---|
| Residual moisture content: | 1.3% |
| tan δ (1 kHz): | 0.26 |
| Ω cm: | $1.0 \times 10^{10}$ |
| DE number (1 kHz): | 18 |
| Crystallinity: | very high, numerous peaks between 2 theta 2 and 50° (main peaks: 3.4°; 5.1°; 8.5°; 11.4°; 21.9°; 22.9°; 34.4°; 38.2°; 39.0°; 45.2°); |
| BET | 20.6 m²/g |
| Particle size distribution: | $d_{50}$ = 15 μm, $d_{95}$ = 39 μm (laser light diffraction) |
| C content (elemental analysis): | 13.74% |

APPLICATION EXAMPLES

Application Example 1a 1 part of the compound from preparation example 1 is incorporated homogeneously using a kneading apparatus over the course of 30 minutes into 99 parts of a toner binder (styrene-acrylate copolymer 60:40 ®Almacryl B-1501). The composition is then ground on a universal laboratory mill and subsequently classified in a centrifugal classifier. The desired particle fraction (4 to 25 μm) is activated with a carrier composed of magnetite particles coated with styrene-methacrylate copolymer (90:10) and measuring 50 to 200 μm.

Application Example 1b

The procedure of application example 1a is repeated but using instead of the styrene-acrylate copolymer a polyester resin based on bisphenol A (®Fine Tone 382-ES) and as carrier silicone-coated ferrite particles measuring 50 to 200 μm.

Measurement takes place on a standard q/m measurement stand. By using a sieve having a mesh size of 45 μm it is ensured that no carrier is entrained when the toner is blown out. The measurements are made at about 50% relative atmospheric humidity. As a function of the activation period the q/m values [μC/g] reported in the table below are measured:

| | Application example | |
|---|---|---|
| Activation period | 1a | 1b |
| | Charge q/m [μC/g] | |
| 5 min. | −10 | −23 |
| 10 min. | −10 | −23 |
| 30 min. | −11 | −24 |
| 2 h | −12 | −27 |

Application Examples 2 to 15

The procedure of application example 1b is repeated, but using instead of the compound from preparation example 1 the compounds from the remaining preparation examples.

The compounds used in the application examples correspond to the preparation examples of the same number.

| | q/m [μC/g] | | | |
|---|---|---|---|---|
| Ex. | 5 min. | 10 min. | 30 min. | 2 h |
| 2 | −21 | −25 | −30 | −31 |
| 3 | −16 | −21 | −24 | −25 |
| 4 | −24 | −27 | −28 | −30 |
| 5 | −15 | −22 | −24 | −25 |
| 6 | −21 | −25 | −30 | −31 |
| 7 | −21 | −25 | −28 | −29 |
| 8 | −23 | −24 | −28 | −30 |
| 9 | −17 | −26 | −30 | −32 |
| 10 | −26 | −35 | −42 | −48 |
| 11 | −18 | −20 | −23 | −25 |
| 12 | −26 | −24 | −25 | −29 |
| 13 | −28 | −30 | −36 | −40 |
| 13a | −30 | −34 | −37 | −40 |
| 14 | −27 | −30 | −37 | −43 |
| 15 | −24 | −28 | −32 | −38 |

Application Examples 16 to 25

The procedure of application examples 8 to 13 is repeated but using instead of 1 part in each case 0.5 part or 2 parts of the respective compounds from preparation examples 8 to 13.

| | Prep. | | q/m [μC/g] | | | |
|---|---|---|---|---|---|---|
| Ex. | Ex. | Parts | 5 min. | 10 min. | 30 min. | 120 min. |
| 16 | 8 | 2 | −26 | −26 | −29 | −31 |
| 17 | 9 | 2 | −19 | −27 | −32 | −35 |
| 18 | 10 | 0.5 | −19 | −22 | −27 | −29 |
| 19 | 10 | 2 | −28 | −37 | −45 | −50 |
| 20 | 11 | 0.5 | −12 | −19 | −21 | −21 |
| 21 | 11 | 2 | −31 | −31 | −34 | −34 |
| 22 | 12 | 0.5 | −15 | −18 | −20 | −22 |
| 23 | 12 | 2 | −26 | −25 | −30 | −34 |
| 24 | 13 | 0.5 | −17 | −20 | −25 | −30 |
| 25 | 13 | 2 | −37 | −36 | −39 | −43 |

Application Examples 26 to 31

The procedure of application examples 10 and 13 is repeated, further incorporating 5 parts of an organic pigment (carbon black ®Mogul L, Cabot; ®Toner Magenta EO2, Clariant (C.I. Pigment Red 122); ®Toner Yellow HG, Clariant (C.I. Pigment Yellow 180)).

| | | Prep. | Organic | q/m [μC/g] | | | |
|---|---|---|---|---|---|---|---|
| Ex. | Parts | Ex. | pigment | 5 min. | 10 min. | 30 min. | 120 min. |
| 26 | 1 | 10 | Toner Magenta EO2 | −17 | −21 | −23 | −23 |
| 27 | 1 | 10 | Toner Yellow HG | −20 | −23 | −26 | −28 |
| 28 | 1 | 10 | carbon black | −17 | −20 | −21 | −20 |
| 29 | 1 | 13 | Toner Magenta EO2 | −17 | −20 | −22 | −22 |
| 30 | 1 | 13 | Toner Yellow HG | −18 | −21 | −22 | −23 |
| 31 | 1 | 13 | carbon black | −19 | −22 | −21 | −22 |

Application Examples 32 to 34

The procedure of application examples 10 and 13 is repeated, with the further incorporation of 2 or 3 parts of a colorant having an intrinsic electrostatically positive effect (C.I. Solvent Blue 125, see comparative example A).

| Ex. | Prep. Ex. | Parts of colorant | q/m [µC/g] | | | |
|---|---|---|---|---|---|---|
| | | | 5 min. | 10 min. | 30 min. | 120 min. |
| 32 | 10 | 2 | −8 | −5 | −2 | 0 |
| 33 | 10 | 3 | −6 | −3 | −1 | +1 |
| 34 | 13 | 2 | −9 | −7 | −5 | −2 |

Comparative Example A

The procedure of application example 32 is repeated, with the incorporation of 2 parts of C.I. Solvent Blue 125 but without any charge control agent of the invention.

| Activation period | Charge q/m [µC/g] |
|---|---|
| 5 min | −5 |
| 10 min | ±0 |
| 30 min | +5 |
| 120 min | +6 |

The pronounced positive intrinsic triboelectric effect of the blue colorant is clearly evident.

Application Example 35

1 part of the compound from preparation example 10 was incorporated homogeneously into 99 parts of a powdercoating binder (®Crylcoat 430) as described for the application examples mentioned above. The triboelectric spraying of the powders (powdercoating materials) was carried out using a TriboStar spraying apparatus from Intec (Dortmund), featuring a standard spraying pipe and a star-shaped internal rod, with a maximum powder throughput and a spraying pressure of 3 and 5 bar. The current strength arising from the electrostatic charge of powdercoating material or powder was displayed in µA. The deposition rate was subsequently determined, in %, by differential weighing from the sprayed and the deposited powdercoating material.

| Pressure [bar] | Current [µA] | Deposition rate [%] |
|---|---|---|
| 3 | 4.2 | 43 |
| 5 | 5.6 | 49 |

The invention claimed is:

1. A process for controlling the charge of an electrophotographic toner, electrophotographic developer, powder coating material, electret material or a chargeable material in an electrostatic separation process comprising the step of adding at least one charge control agent to the electrophotographic toner, electrophotographic developer, powder coating material electric material or chargeable material, wherein the at least one charge control agent is a layered double hydroxide salt comprising
   a combination of trivalent and divalent and optionally monovalent metal cations having hydroxyl groups wherein the number of hydroxyl groups in the layered double hydroxide salt is from 1.8 to 2.2 times the sum of all the metal cations wherein the layered double hydroxide salt contains $Mg^{2+}$ and $Al^{3+}$, and one or more organic anions A selected from the group consisting of benzilic acid, naphthalenedisulfonic acid, naphthalenedicarboxylic acid, hydroxynaphthoic acid, octanedicarboxylic acid, decanedicarboxylic acid, dodecanedicarboxylic acid, tetradecanedicarboxylic acid, hexadecanedicarboxylic acid, octadecanedicarboxylic acid, naphthalenetetracarboxylic acid, sulfosuccinic acid ($C_6$-$C_{20}$)-alkyl monoester, sulfosuccinic acid ($C_6$-$C_{22}$)-fluoroalkyl monoester, and an anion of a $C_{12}$-$C_{44}$ fatty acid.

2. The process as claimed in claim 1, wherein the layered double hydroxide salt comprises monovalent metal cations selected from the group consisting of $Li^+$, $Na^+$ and $K^+$.

3. The process as claimed in claim 1, wherein the layered double hydroxide salt has a molar ratio $Mg^{2+}$: $Al^{3+}$ of from 3.1:1 to 1:2.

4. The process as claimed in claim 1, wherein the layered double hydroxide salt is a calcined hydrotalcite.

5. The process as claimed in claim 1, wherein the adding step further comprises adding at least one charge control agent selected from the group consisting of triphenylmethanes; ammonium compounds; immonium compounds, iminium compounds; fluorinated ammonium compounds; fluorinated immonium compounds; biscationic acid amides; polymeric ammonium compounds; diallylammonium compounds; aryl sulfide derivatives, phenol derivatives; phosphonium compounds; fluorinated phosphonium compounds; calix[n]arenes, cyclically linked oligosaccharides, interpolyelectrolyte complexes; polyester salts; metal complex compounds, salts of ionic structured silicates, hydroxycarboxylic acid-metal complexes; hydroxycarboxylic acid-nonmetal complexes, benzimidazolones; azines, thiazines and oxazines.

6. The process as claimed in claim 1, wherein the at least one charge control agent is present from 0.01% to 50% by weight, based on the total weight of the electrophotographic toner, electrophotographic developer, coating material, powdercoating material, electret material or chargeable material.

7. The process as claimed in claim 1, wherein divalent metal cations are selected from the group consisting of $Mg^{2+}$, $Ca^{2+}$, $Zn^{2+}$, $Co^{2+}$, $Ni^{2+}$, $Fe^{2+}$, $Cu^{2+}$ and $Mn^{2+}$.

8. The process as claimed in claim 1, wherein the trivalent metal cations present are selected from the group consisting of $Al^{3+}$, $Fe^{3+}$, $Co^{3+}$, $Mn^{3+}$, $Ni^{3+}$, $Cr^{3+}$ and $B^{3+}$.

9. The process as claimed in claim 1, wherein the $C_{12}$-$C_{44}$ fatty acid is stearic acid.

10. A charge controlled electrophotographic toner, electrophotographic developer, powder coating material, electret material or chargeable material for use in an and in electrostatic separation process made in accordance with the process of claim 1.

11. The process according to claim 1, wherein the electrophotographic toner, electrophotographic developer, powder coating material, electret material or a chargeable material further comprises a binder and the adding step further comprises incorporating the at least one charge control agent into the binder.

12. The process as recited in claim 1, wherein the at least one charge control agent is present as an aqueous, aqueous-organic or organic dispersion.

13. An electrophotographic toner, powder or powdercoating material, comprising from 30% to 99.99% by weight of a binder, from 0.01% to 50% by weight of at least one layered double hydroxide salt comprising
   a calcined hydrotalcite or an uncalcined hydrotalcite, and
   one or more organic anions A selected from the group consisting of benzilic acid, naphthalenedisulfonic acid, naphthalenedicarboxylic acid, hydroxynaphthoic acid, octanedicarboxylic acid, decanedicarboxylic acid, dodecanedicarboxylic acid, tetradecanedicarboxylic acid, hexadecanedicarboxylic acid, octadecanedicarboxylic acid, naphthalenetetracarboxylic acid, sulfosuccinic acid ($C_6$-$C_{20}$)-alkyl monoester, sulfosuccinic acid ($C_6$-$C_{22}$)-fluoroalkyl monoester, and an anion of a $C_{12}$-$C_{44}$ fatty acid, wherein the weight percentages are based on the total weight of the electrophotographic toner, powder or powdercoating material.

14. The electrophotographic toner, powder or powdercoating material as claimed in claim 13, further comprising from 0.001% to 50% by weight of a colorant.

* * * * *